(12) United States Patent
Hautecoeur

(10) Patent No.: US 12,522,348 B2
(45) Date of Patent: Jan. 13, 2026

(54) SYSTEM FOR TRANSMITTING COMMANDS TO A HYDRAULIC SERVO ACTUATOR

(71) Applicant: SAFRAN ELECTRONICS & DEFENSE, Paris (FR)

(72) Inventor: Julien Hautecoeur, Moissy Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 83 days.

(21) Appl. No.: 18/719,656

(22) PCT Filed: Dec. 16, 2022

(86) PCT No.: PCT/FR2022/052401
§ 371 (c)(1),
(2) Date: Jun. 13, 2024

(87) PCT Pub. No.: WO2023/111484
PCT Pub. Date: Jun. 22, 2023

(65) Prior Publication Data
US 2025/0066014 A1     Feb. 27, 2025

(30) Foreign Application Priority Data
Dec. 17, 2021   (FR) ...................................... 2113782

(51) Int. Cl.
*B64C 13/50*     (2006.01)
*B64C 13/40*     (2006.01)
*B64C 27/68*     (2006.01)

(52) U.S. Cl.
CPC ............ *B64C 13/40* (2013.01); *B64C 13/503* (2013.01); *B64C 27/68* (2013.01)

(58) Field of Classification Search
CPC ........ B64C 13/40; B64C 13/503; B64C 27/68
See application file for complete search history.

(56) References Cited

U.S. PATENT DOCUMENTS

| 5,806,805 A | * | 9/1998 | Elbert | ..................... B64C 13/42 244/76 A |
| 2003/0136129 A1 | * | 7/2003 | Brocard | ................... F15B 9/16 60/771 |
| 2017/0253320 A1 | * | 9/2017 | Baran | ..................... B64C 13/04 |

FOREIGN PATENT DOCUMENTS

| EP | 1 331 404 A1 | 7/2003 |
| EP | 3 213 990 A1 | 9/2017 |

OTHER PUBLICATIONS

International Search Report as issued in International Patent Application No. PCT/FR2022/052401, dated Mar. 31, 2023.

* cited by examiner

*Primary Examiner* — Tye William Abell
(74) *Attorney, Agent, or Firm* — Pillsbury Winthrop Shaw Pittman LLP

(57) ABSTRACT

A system for transmitting commands to at least one hydraulic servo actuator, includes a mechanical system including: a rotary electrical actuator including a first and a second channel, a linear electrical actuator including a third channel, the linear electrical actuator being connected to the rotary electrical actuator by a mechanical connection and being connected to the hydraulic servo actuator by a mechanical connection; a control system including: a first control device connected via an electrical connection to the first channel; a second control device connected via an electrical connection to the second channel; a third control device connected via an electrical connection to the third channel.

10 Claims, 5 Drawing Sheets

[Fig. 1]
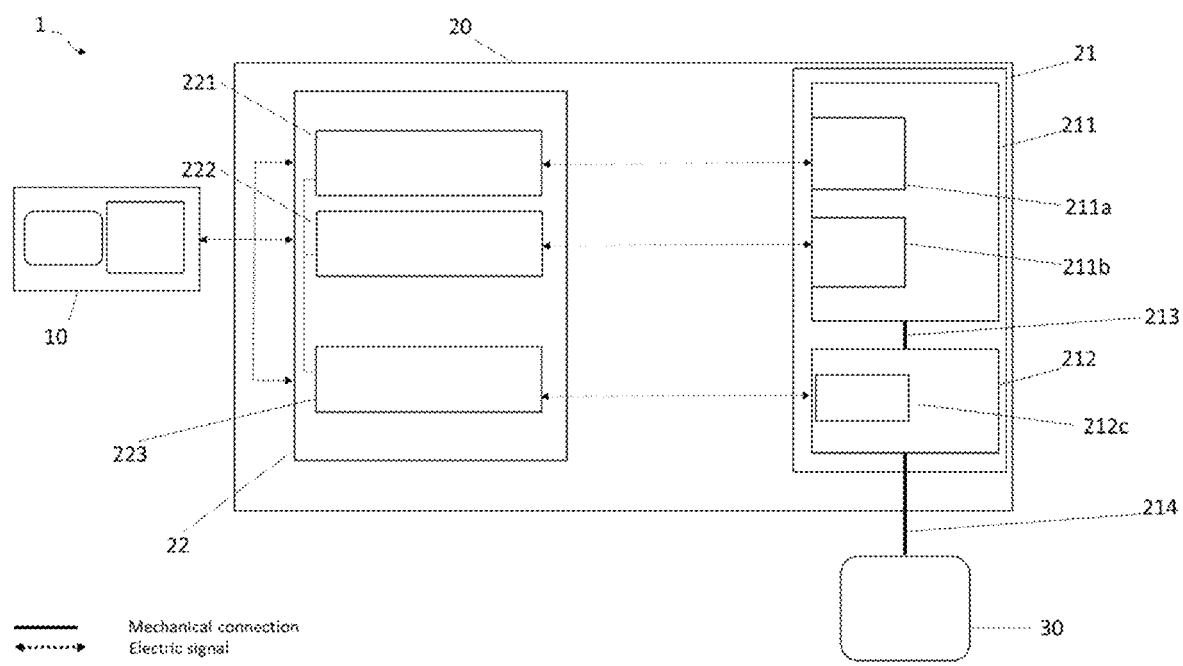

[Fig. 2]
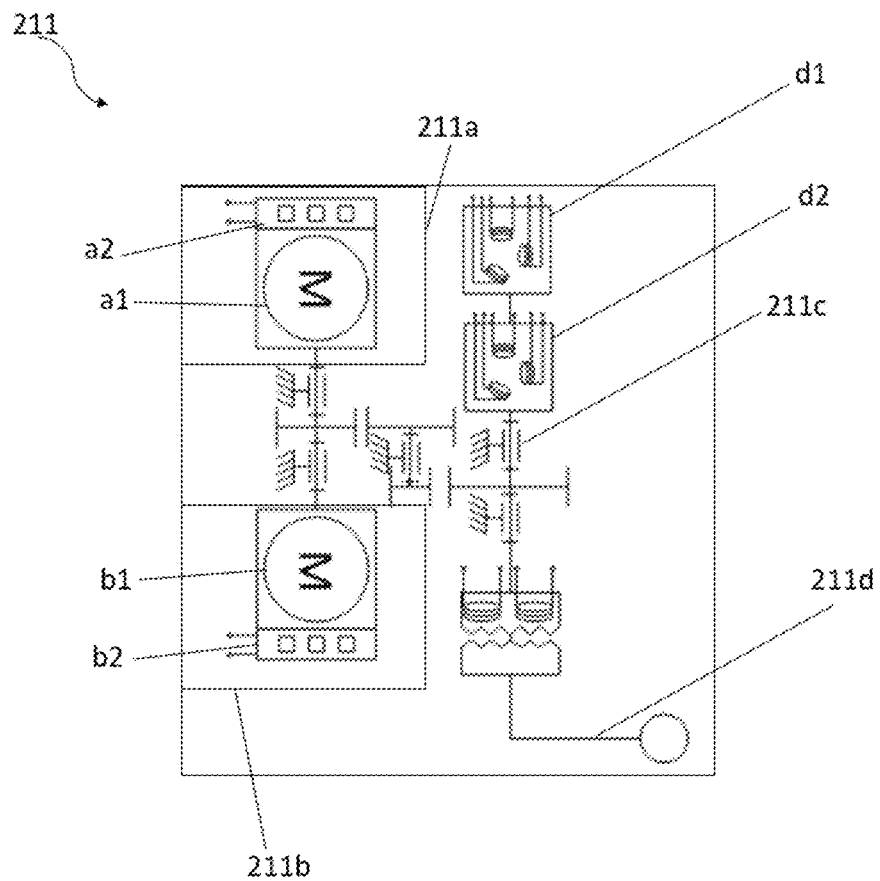

[Fig. 3]
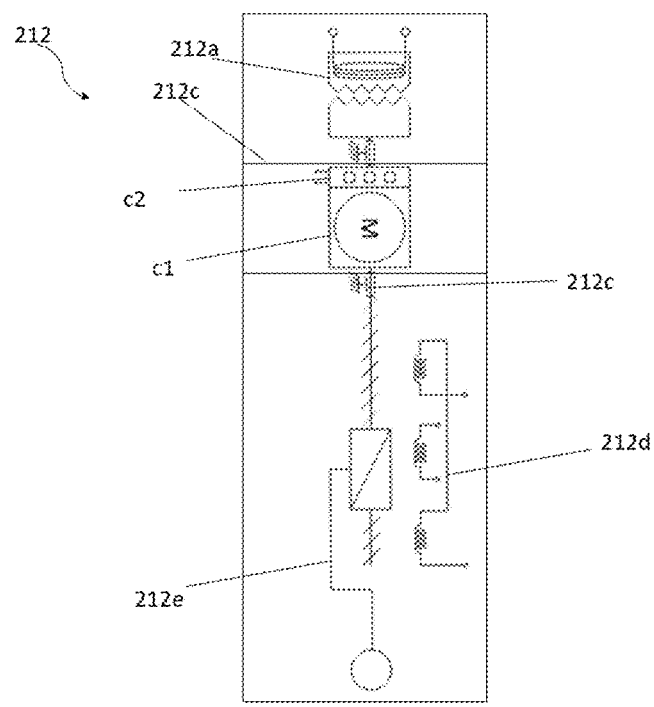
[Fig. 4]
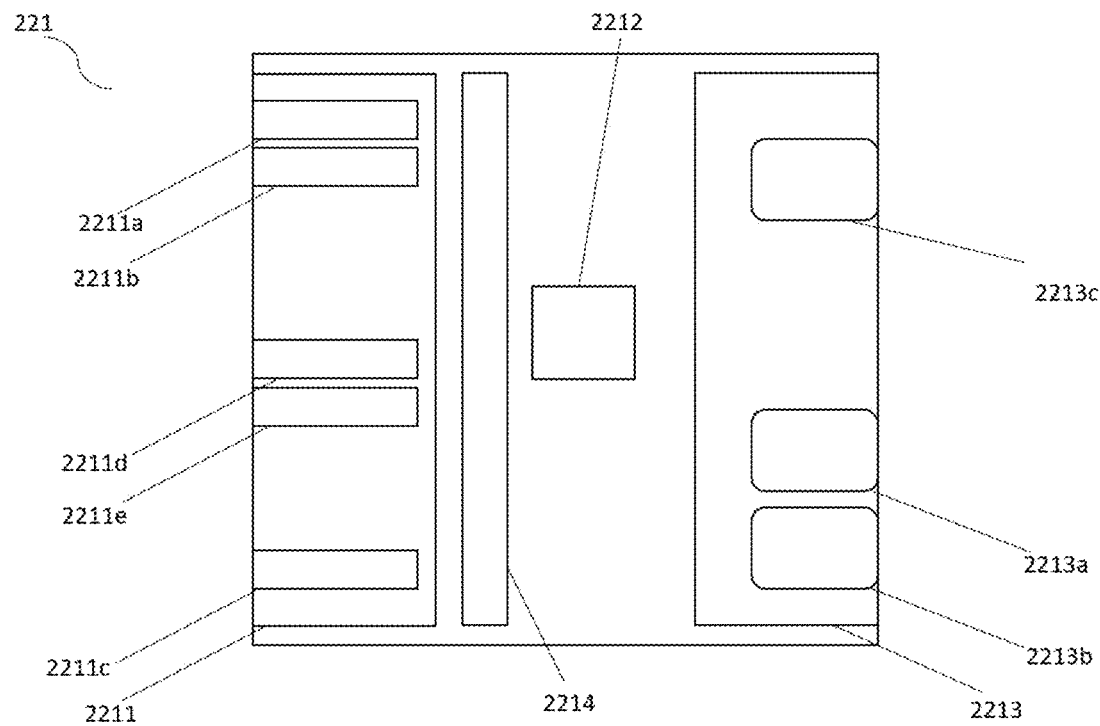

[Fig. 5]
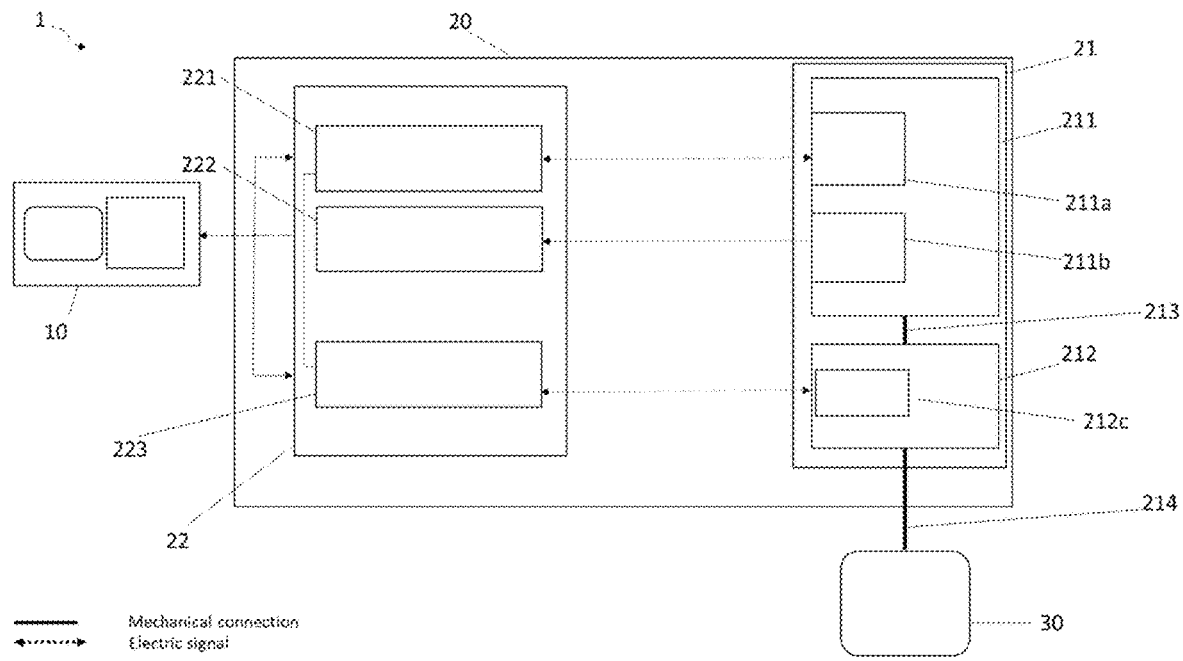
[Fig. 6]
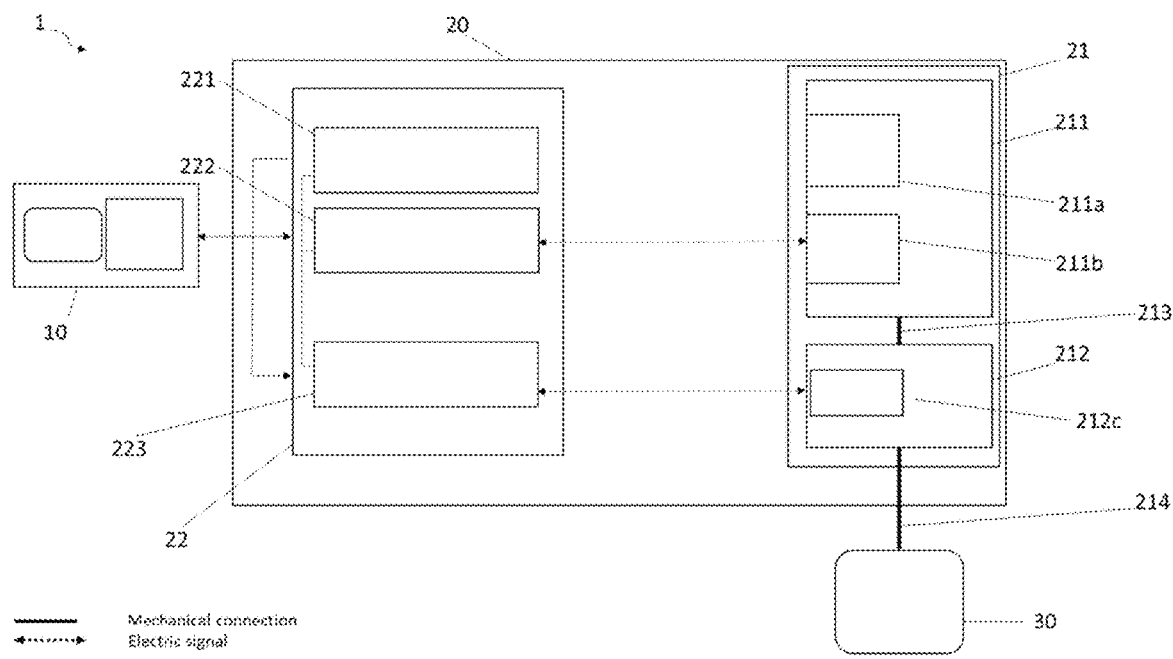

[Fig. 7]
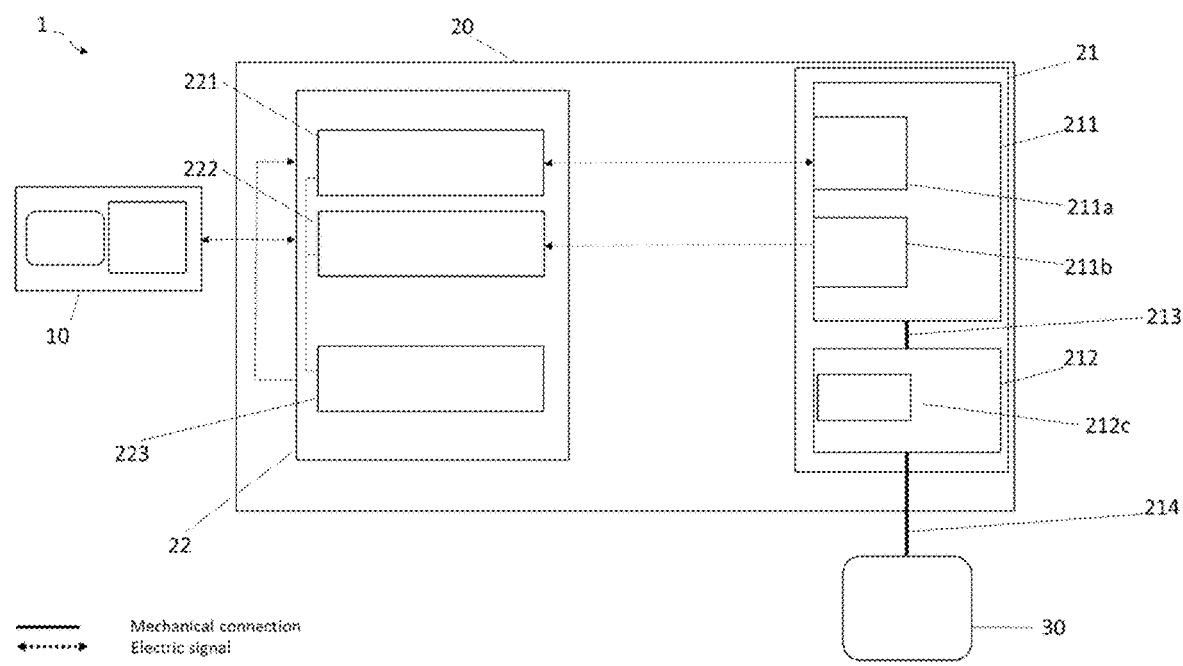

SYSTEM FOR TRANSMITTING COMMANDS TO A HYDRAULIC SERVO ACTUATOR

CROSS-REFERENCE TO RELATED APPLICATIONS

This application is the U.S. National Stage of PCT/FR2022/052401, filed Dec. 16, 2022 which in turn claims priority to French patent application number 2113782 filed Dec. 17, 2021. The content of these applications are incorporated herein by reference in their entireties.

TECHNICAL FIELD OF THE INVENTION

The technical field of the invention is that of flight commands of an aircraft.

This invention relates to a system for transmitting command to a hydraulic servo actuator.

TECHNOLOGICAL BACKGROUND OF THE INVENTION

In the field of aeronautics, the flight commands of an aircraft and in particular a helicopter enable a pilot to command and modify the path of the helicopter about the three axes: pitch, roll and yaw. In particular, the primary flight commands of a helicopter are essential to ensure a secure flight and include three types of system: a command emitting system such as rudder command pedals, a collective pitch lever and/or a throttle command and a cyclic stick, command receiver systems such as a main rotor (blades) and an anti-torque rotor and finally command transmission systems between the emitter and receiver systems, the transmission systems being able to be mechanical and hydromechanical.

Mechanical transmissions, which appeared in the first aeroplanes, are made up of cables on pulleys and/or pushrods, enabling the pilot to exert force directly on the command receiver systems, such as the rotors in a helicopter. As mechanical transmissions are more complex to set up and use in large, heavy aircraft, they have been replaced by hydromechanical transmissions and are currently only used in light aeroplanes.

A hydromechanical transmission comprises two circuits: a mechanical circuit including, for example, cables and pulleys and connecting the cockpit commands to a hydraulic circuit, the hydraulic circuit including hydraulic pumps, tanks, hoses, valves/servo-valves and hydraulic actuators. The pilot emits a command, acting on the commands in the cockpit, which are transmitted by the mechanical circuit to the hydraulic circuit that implements the hydraulic actuators enabling the main rotor and the anti-torque rotor to be moved. Hydromechanical transmissions are widely used in helicopters, however a few helicopters that include electric transmissions have been developed.

Unlike aeroplanes, Fly-By-Wire commands, comprising electrical, electronic and computing transmission systems, are not yet widely used in helicopters. In an aeroplane, electric, electronic and computing transmission systems transmit flight commands sent by a Flight Control Computer (FCC) to hydraulic actuators that move the control surfaces of the aeroplane.

The use of Fly-By-Wire architecture is advantageous in aeroplanes because the mechanical transmissions between the commands actuated by the pilot and the control surfaces of an aeroplane are replaced with electrical transmissions, thereby reducing the physical forces exerted by the pilot. In addition, Fly-by-Wire architecture is advantageous over the mechanical and hydromechanical architectures mentioned previously because the Fly-by-Wire architecture is easy to install and set up and provides additional functions.

Thus, in a helicopter, an electrical transmission system enables the rotors to be controlled via the Flight Control Computer (FCC), which has full authority and determines their movement by virtue of the helicopter's speed, position, altitude, etc. via hydraulic actuators.

However, the use of current electronic flight commands comprises a major drawback: a failure of the flight control computer and/or of the system for electrically transmitting flight commands to the hydraulic actuators can lead to the loss of ability to command at least one axis of the helicopter, resulting in the deterioration of the apparatus.

There is therefore a need to find a flight command architecture making it possible to dispense with the mechanical connections between the commands and the hydraulic actuators and guarantee high availability of the flight commands, in order to avoid degradation to the aircraft being flown and enabling the current architecture of the hydraulic actuators to be retained. Furthermore, the size of a helicopter requires an electric flight command architecture of low spatial overall size.

SUMMARY OF THE INVENTION

The invention offers a solution to the problems discussed previously, by making it possible to transmit electrical commands emitted from a flight control computer to at least one hydraulic actuator, by virtue of an electromechanical architecture offering high availability of flight commands, while respecting a restricted overall size.

A first aspect of the invention relates to a system for transmitting command to at least one hydraulic servo actuator including:
At least one mechanical system comprising:
  a rotary electric actuator including a first pathway comprising a motor, and a second pathway including a motor;
  a linear electric actuator including a third pathway including a motor, the linear electric actuator being connected to the rotary electric actuator by a first mechanical connection and being configured to be connected to the hydraulic servo actuator by a second mechanical connection;
A command system comprising:
  a first command device connected through an electrical connection to the first pathway of the rotary electric actuator of said mechanical system,
  a second command device connected through an electrical connection to the second pathway of the rotary electric actuator of said mechanical system,
  a third command device connected through an electrical connection to the pathway of the linear electric actuator.

By virtue of the invention, it is possible to dispense with entirely mechanical circuits between the commands of the cockpit and the hydraulic servo actuators of a helicopter, which makes it possible to limit the forces exerted by a pilot in the cockpit. In addition, the invention makes it possible to retain the servo actuators currently used in helicopters, thereby reducing production costs. Furthermore, the presence of three pathways makes it possible to guarantee availability of commands in case of failure of a pathway.

According to one embodiment, the command system is configured to operate in at least one mode of the following operating modes:

so-called nominal operating mode in which:
the first command device is in an operational validity state, and is configured to:
receive a piece of data from the first pathway, the piece of data relating to operating parameters of said first pathway;
transmit the piece of data relating to the operating parameters received to a calculator;
receive a command from the calculator to the motor of the first pathway;
emit the command to the motor of the first pathway;
the second device is in a standby validity state and is configured to:
receive a piece of data from the second pathway, the piece of data relating to operating parameters of said second pathway;
emit the piece of data relating to the operating parameters received to the calculator;
the third command device is in an operational validity state and is configured to:
receive a piece of data from the third pathway, the piece of data relating to operating parameters of said third pathway;
emit the piece of data relating to the operating parameters received to the calculator;
receive a command emitted from the calculator to the motor of the third pathway, simultaneously with the reception of the command by the first command device,
emit the command to the motor of the third pathway;
So-called failure mode of the first command device in which:
the first command device is in a non-operational validity state,
the command device is configured to shift from a standby validity state to an operational validity state, the change of state of the second command device resulting from the non-operational validity state of the first command device, and is configured to:
receive a piece of data from the second pathway, the piece of data relating to operating parameters of said second pathway;
transmit the first piece of data relating to the operating parameters received to the calculator;
receive from the calculator a command to be emitted to the motor of the second pathway;
emit the command to the motor of the second pathway;
the third command device is in an operational validity state and is configured to:
receive a piece of data from the third pathway, the second piece of data relating to operating parameters of said third pathway;
transmit the piece of data relating to the operating parameters received to the calculator;
receive from the calculator, at the same time as the second command device, a command to be emitted to the motor of the third pathway;
emit the command to the motor of the third pathway;
So-called failure mode of the third command device in which:
the first command device is in an operational validity state, and is configured to:

receive a piece of data from the first pathway, the piece of data relating to operating parameters of said first pathway;
transmit the piece of data relating to the operating parameters received to the calculator;
receive from the calculator at least one command to be emitted to the motor of the first pathway;
emit the command to the motor of the first pathway
the second device is in a standby validity state and is configured to:
receive at least one piece of data from the second pathway, the piece of data relating to operating parameters of said pathway;
transmit the piece of data relating to the operating parameters received to the calculator;
the third command device is in a non-operational state.

For each operating mode, the sum of each command received respectively by the motor of the first pathway or the motor of the second pathway and/or the motor of the third pathway ensures mechanical command of the hydraulic servo actuator.

By operational validity state of a command device, it is meant a state during which the command device can receive commands emitted from the calculator, intended for the motor to which said command device is connected, and can transmit the commands to the motor to which said command device is connected and during which the command device can receive data by the pathway to which it is connected.

By standby validity state of a command device, it is meant a state during which the command device receives data by the pathway to which it is connected and during which the command device cannot transmit any commands to the motor to which said command device is connected.

By faulty validity state of a command device, it is meant a validity state during which the electrical connection between the command device and its pathway is broken and no electrical communication between both of them is possible.

Advantageously, each command emitted from the calculator is distributed as a function of the operational command devices, which makes it possible to command the hydraulic servo actuator even when a command device is faulty, and to guarantee availability of the commands. Thus, the command of the hydraulic servo actuator is the result of at least one command received by a motor moving the electric actuator in which said motor is included.

According to one embodiment of the invention, a command emitted from the calculator to a command device comprises a position set point intended for the motor included in the pathway connected to said command device.

According to one embodiment of the invention:
the first pathway comprises a motor position sensor and a rotary position sensor;
the second pathway comprises a motor position sensor and a rotary position sensor;
the third pathway comprises a third motor position sensor and a linear position sensor;
a piece of data received by a pathway of the first, second and third pathways relating to the operating parameters of that pathway comprises:
a piece of data relating to the position of the motor included in the pathway and/or
a piece of data relating to the position of the actuator in which said pathway is included.

The rotary position sensor included in the first pathway is a position sensor of the rotary actuator.

The rotary position sensor included in the second pathway is a position sensor of the rotary actuator.

The linear position sensor included in the third pathway is a position sensor of the linear actuator.

Advantageously, the embodiment mentioned previously makes it possible to know the position of each motor and each actuator so that the calculator can recalculate the position command to each motor connected to an operational command device, the sum of each command making it possible to obtain a desired displacement of the servo actuator.

According to one embodiment, the rotary actuator is irreversible.

According to one embodiment, the linear actuator is irreversible.

According to one embodiment, the command system is included in the rotary actuator or in the linear actuator.

According to one embodiment, the first mechanical connection and the second mechanical connection are in series.

According to one embodiment, the system comprises four mechanical systems. This embodiment advantageously makes it possible to command 4 servo actuators.

A second aspect of the invention relates to an assembly for commanding at least one hydraulic servo actuator comprising:
a command module;
a system according to the first aspect of the invention;
at least one hydraulic servo actuator;

A third aspect of the invention relates to an aircraft comprising a command system according to the preceding claim.

BRIEF DESCRIPTION OF THE FIGURES

The figures are set forth byway of indicating and in no way limiting purposes of the invention.

FIG. 1 shows a schematic representation of an assembly for commanding at least one hydraulic servo actuator, comprising a command transmission system according to the invention;

FIG. 2 is a diagram of a rotary electric actuator included in the transmission system according to the invention;

FIG. 3 is a diagram of a linear electric actuator included in the transmission system according to the invention;

FIG. 4 is a diagram of one embodiment of a command device;

FIG. 5 is a diagram of the assembly for commanding at least one hydraulic servo actuator when the transmission system according to the invention is in a so-called nominal operating mode;

FIG. 6 is a diagram of the assembly for commanding at least one hydraulic servo actuator when the transmission system according to the invention is in a so-called failure operating mode of the first command device;

FIG. 7 is a diagram of the assembly for commanding at least one hydraulic servo actuator when the transmission system according to the invention is in a so-called failure operating mode of the third command device.

DETAILED DESCRIPTION

The figures are set forth byway of indicating and in no way limiting purposes of the invention.

Unless otherwise specified, a same element appearing in different figures has a single reference.

FIG. 1 shows a schematic representation of one embodiment of the assembly 1 for commanding at least one servo actuator.

The assembly 1 is included in an aircraft. Preferably, the aircraft is a helicopter.

The command assembly 1 comprises a control module 10, a system 20 for transmitting command to at least one hydraulic servo actuator according to the invention and a hydraulic servo actuator 30.

According to one embodiment, not represented in FIG. 1, the command assembly 1 comprises four hydraulic servo actuators 30.

The control module 10 comprises at least one calculator 11 and at least one power supply 12.

The calculator 11 comprises a processor not represented in FIG. 1.

Preferably, the calculator is a flight control computer (FCC).

According to a preferred embodiment, in which the command assembly comprises four servo actuators 30, the control module 10 comprises four calculators 11.

The power supply 12 preferably comprises a first and a second output, not represented in FIG. 1, each configured to deliver a voltage, preferably a direct voltage.

Preferably, the voltage value delivered by the first output 12a and/or the second output 12b is 28 volts.

The transmission system 20 includes at least one electronic command system 22 and at least one mechanical system 21.

The command system 22 comprises a first, a second and a third command device 221, 222, 223, each command device being connected to the other two by an electrical connection.

The mechanical system 21 comprises a rotary electric actuator 211 and a linear electric actuator 212.

The rotary electric actuator 211 comprises a first pathway 211a connected through an electrical connection to the first command device 221. The electrical connection comprises at least one electrical signal. The electrical signal may be digital or analogue.

The rotary electric actuator 211 comprises a second pathway 211b connected through an electrical connection to the first command device 222. The electrical connection comprises at least one electrical signal. The digital signal may be digital or analogue.

The linear electric actuator 212 comprises a third pathway 212c connected through an electrical connection to the third command device 223. The third electrical connection comprises at least one electrical signal. The electrical signal may be digital or analogue.

The rotary actuator 211 is connected by a first mechanical connection 213 to the linear electric actuator 212 and the linear actuator 211 is connected by a second mechanical connection 214 to the hydraulic servo actuator 30.

The first mechanical connection 213 is preferably a pivot connection and the second mechanical connection 214 is preferably a pivot connection.

According to a preferred embodiment, the first mechanical connection 213 and the second mechanical connection 214 are in series.

According to the preferred embodiment in which the command assembly 1 comprises four servo actuators, and the control module 10 comprises four calculators, the transmission system 20 comprises four mechanical systems 21, each calculator 11 being associated with a mechanical system 21 and with a hydraulic servo actuator 30 to which the mechanical system 21 is connected.

FIG. 2 is a schematic representation of the rotary electric actuator 211 included in the mechanical system 21. The rotary actuator 211 comprises the first pathway 211a and the second pathway 211b.

The rotary electric actuator 211 may comprise a first reducing gear 211c and an output shaft 211d.

The first pathway 211a of the rotary actuator 211 comprises a motor a1, preferably a brushless motor, and a motor position sensor a2, configured to measure the position of the motor a1 of the first pathway 211a.

Preferably, the motor a1 of the first pathway 211a is a three-phase motor and comprises three three-phase inputs, not represented in FIG. 2.

Preferably, the motor position sensor a2 in the first pathway 211a is a Hall effect sensor.

The second pathway 211b of the actuator 211 comprises a motor b1, preferably a brushless motor, and a motor position sensor b2, configured to measure the position of the motor b1 of the second pathway 211b.

Preferably the motor b1 of the second pathway 211b is a three-phase motor and comprises three three-phase inputs, not represented in FIG. 3.

Preferably the motor position sensor b2 of the second pathway 211b is a Hall effect sensor. The output shaft 211d preferably comprises a first angular position sensor d1, a second angular position sensor d2, a brake d3, preferably an electrically commanded dual-supply dog clutch brake.

Preferably the first angular position sensor d1 is connected to the first pathway 211a, and the second angular position sensor d2 is connected to the second pathway 211b.

According to one embodiment not represented in FIG. 2, the first angular position sensor d1 is included in the first pathway 211a, and the second angular position sensor d2 is included in the second pathway 211b.

The brake d3 is preferably a spring-applied brake.

The first and second angular position sensors (d1, d2) are configured to measure the position of the rotary electric actuator 211.

When the output shaft 211d comprises the electrically commanded dual-supply dog clutch brake, said clutch brake ensures the irreversibility of the rotary actuator 211.

FIG. 3 is a schematic representation of the linear electric actuator 212 included in the mechanical system 21.

The linear electric actuator 212 comprises the third pathway 212c.

The linear electric actuator 212 may comprise a reducing gear 212b, a brake 212a, a linear position sensor 212d and a ball screw 212e.

The brake 212a is preferably an electrically commanded dual-supply dog clutch brake.

The brake 212a is preferably a spring-applied brake.

When the linear electric actuator 212 comprises the electrically commanded dog clutch brake, the linear electric actuator 212 is irreversible.

The third pathway 212c of the linear electric actuator 212 comprises a motor c1, preferably a brushless motor, and a motor position sensor c2 configured to measure the position of the motor c1.

Preferably, the motor c1 of the third pathway 212c is a three-phase motor and comprises a three-phase input, not represented in FIG. 3.

Preferably, the motor position sensor c2 of the third pathway 212c is a Hall effect sensor. According to one embodiment, the linear position sensor 212d is included in the third pathway 212c.

FIG. 4 is a schematic representation of one embodiment of the first command device 221 included in the command system 22.

As the first, second and third command devices (221, 222, 223) have an identical architecture, only the first command device 221 is represented.

The first command device 221 comprises a first command module 2211, a digital circuit 2212 and an actuation module 2213.

The command module 2211 may comprise a first and a second power supply port (2211a, 2211 b), configured to receive an electrical voltage, preferably a direct voltage with a value of 28V.

The command module 2211 comprises at least one command port 2211c.

According to the embodiment according to which the control module 10 comprises four calculators, the plurality of input ports 222 comprises four command ports, each command port of which is electrically connected to a calculator of the four calculators, respectively.

The command module 2211 comprises a Data Serial Input (DSI) port 2211d, a Data Serial Output (DSO) port 2211e.

According to one embodiment, the command module 2211 comprises a communication port, not represented in FIG. 4. Said communication port is configured to receive software instructions, for example.

The first command device 221 may comprise a filter module 2214 configured to perform processing of the signals transmitted by the command module 2211.

Processing of the signals transmitted can be, for example, reducing the noise included in the received signals.

The digital circuit 223 is configured to process signals received by the command module and transmit them to the actuation module 2213.

The digital circuit 223 is configured to process signals received by the actuation module 2213 and transmit them to the command module 2211.

The actuation module 2213 comprises a motor drive module 2213a, at least one data reception module 2213b and a brake drive module 2213c.

The motor drive module 221a comprises a three-phase output, the three-phase output including three electric currents, preferably three direct electric currents.

The brake drive module 2213c provides a two-phase output, the two-phase output including two electric currents, preferably two direct electric currents.

The data reception module 2213 preferably comprises two ports.

The transmission system 20 according to the invention operates according to at least one mode of the following operating modes: so-called nominal operating mode, so-called failure operating mode of the first command device and so-called failure operating mode of the third command device.

During each operating mode of the operating modes mentioned, the command devices can each be respectively in a validity state of the at least three following validity states: operational validity state, standby validity state, faulty validity state.

By operational validity state of a command device, it is meant a validity state during which the command device is configured to implement a plurality of operational steps described in the following.

A first operational step is a step of receiving, by the command device, a piece of data from the pathway connected to said command device, via the data reception module, the piece of data relating to operating parameters of said pathway.

The piece of data relating to the operating parameters of the first pathway comprises a piece of data relating to the position of the motor of the pathway connected to the command device and/or a piece of data relating to the position of the electric actuator comprising the pathway connected to the command device.

The piece of data relating to the position of the motor of the pathway connected to said command device is measured by the motor position sensor of said pathway.

A second operational step is a step of transmitting the piece of data relating to the operating parameters received to the calculator 10, via the command port 2211c.

A third operational step is a step of receiving a command emitted from the calculator 10, via the command port 2211c, to the motor of the pathway connected to the command device.

The command to the motor is preferably a position command of said motor. Preferably, the position command of said motor is a real value, preferably having a unit in mm.

A fourth operational step is a step of emitting the command to the motor included in the pathway connected to the command device.

By standby validity state of a command device, it is meant a state during which the command device is configured to implement standby steps.

A first standby step is a step of receiving, by the command device, a piece of data from the pathway connected to said command device, via the data reception module, the piece of data relating to operating parameters of said pathway.

The piece of data relating to the operating parameters of the first pathway comprises a piece of data relating to the position of the first motor included in the pathway connected to said command device and/or a piece of data relating to the position of the actuator comprising the pathway connected to said command device.

A second standby step is a step of transmitting the piece of data relating to the operating parameters received to the calculator 10, via the command port 2211c.

By faulty validity state of a command device, it is meant a validity state during which the electrical connection between said command device and its pathway is broken and no communication between the two is possible. In addition, the electrical connection between said command device and the calculator 10 is broken and no communication between the two is possible.

Each command device of the first, second and third command devices (221,222,223) is configured to communicate its validity state to the other devices via the command module 2211 and more precisely via the serial output data port 2211e.

Each command device of the first, second and third command devices (221,222,223) is configured to receive the validity state of the other devices via the command module 2211 and more precisely via the serial input data port 2211d.

Each command device of the first, second and third command devices (221, 222, 223) is configured to communicate its validity state to the calculator 10 via the command port 2211c.

The calculator 10 simultaneously emits a command to each command device being in an operational validity state, the command being intended for the motor of the pathway connected to said device.

Preferably, the command comprises a fraction of the desired position value for the hydraulic servo actuator 30.

Preferably, the fraction of the desired position value of the hydraulic servo actuator 30 is determined on the basis of a desired position value of the hydraulic servo actuator and the number of operational command devices.

For example, the fraction of the desired position value is obtained by dividing the desired position value of the servo actuator by the number of operational command devices.

Thus, the command of the hydraulic servo actuator 30 results from the sum of the values included in the commands received respectively by each command device being in an operational validity state.

FIG. 5 represents the command assembly 1, when the system according to the invention is operating according to a so-called nominal operating mode.

According to the nominal operating mode, the first command device 211 is in an operational validity state, the second command device 212 is in a standby validity state and the third command device 213 is in an operational validity state.

For example, when the operating mode of the transmission system 20 according to the invention is said to be nominal, in order to move the hydraulic servo actuator 30 by a value equal to X, the calculator 11 sends a command comprising a value equal to X/2 to the first operational command device 221, and a command comprising a value equal to X/2 to the third operational command device 223.

Thus, the motor a1 of the first pathway 211a receives a position command whose value is equal to X/2, enabling the rotary actuator 211 to move by a value equal to X/2 and the linear actuator 212 to be moved by virtue of the first mechanical connection. In addition, the motor c1 of the third pathway 212c receives, simultaneously with the reception of the command by the motor a1 of the first pathway 211a, a position command emitted from the calculator whose value is equal to X/2, enabling the linear actuator 212 to move by a value equal to X/2. Thus, the linear actuator 212 receives an electrical command of value X/2, and a mechanical command of value X/2, the linear actuator thus moves by a value X and enables the hydraulic servo actuator 30 to be moved, via the second mechanical connection 214, according to a value X.

FIG. 6 represents the command assembly 1, when the system according to the invention is operating according to a so-called failure mode of the first command device 211.

According to the so-called failure operating mode of the first command device 211, the first command device 211 is in a faulty validity state, the second command device 212 is configured to shift from a standby validity state to an operational validity state, the change of state of the second command device 212 resulting from the non-operational validity state of the first command device 211, and the third command device 213 is in an operational validity state.

For example, when the operating mode of the transmission system 20 according to the invention is said to be failure of the first device 221, when the calculator 10 wishes to obtain a position of the hydraulic servo actuator of a value equal to X, the calculator sends a command comprising a value equal to X/2 to the second operational command device 222, and a command comprising a value equal to X/2 to the third operational command device 223.

Thus, the motor b1 of the second pathway 211b receives a position command whose value is equal to X/2, enabling the rotary actuator 211 to move by an amount equal to X/2 and the linear actuator 212 to be moved by virtue of the first mechanical connection. In addition, the motor c1 of the third pathway 212c receives, simultaneously with the reception of the command by the motor b1 of the second pathway 211b, a position command whose value is equal to X/2, enabling the linear actuator 212 to move by a value equal to X/2. Thus, the linear actuator 212 receives an electrical command of value X/2, and a mechanical command of value X/2, the linear actuator therefore moves by a value X and enables the hydraulic servo actuator 30 to be moved, via the second mechanical connection 214, according to a value X.

FIG. 7 represents the command assembly 1, when the system according to the invention is operating according to a so-called failure mode of the third command device 211.

According to the so-called failure mode of the third command device 213, the first command device 211 is in an operational validity state, the second command device 212 is in a standby validity state and the third command device 213 is in a faulty validity state.

For example, when the operating mode of the transmission system 20 according to the invention is said to be nominal, when the calculator 10 wishes to obtain a position of the hydraulic servo actuator of a value equal to X, the calculator sends a command comprising a value equal to X to the first operational command device 221.

Thus, the motor a1 of the first pathway 211a receives a position command whose value is equal to X, enabling the rotary actuator 211 to move by a value equal to X and the linear actuator 212 to be moved by virtue of the first mechanical connection. In this operating mode, the linear actuator 212 only receives a mechanical position command, equal to X. The linear actuator 212 therefore moves by a value X and enables the hydraulic servo actuator 30 to be moved according to a value X via the second mechanical connection 214.

The invention claimed is:

1. A system for transmitting command to at least one hydraulic servo actuator including:
   at least one mechanical system comprising:
      a rotary electric actuator including a first pathway comprising a motor, and a second pathway including a motor;
      a linear electric actuator including a third pathway including a motor, the linear electric actuator being connected to the rotary electric actuator by a first mechanical connection and being configured to be connected to the hydraulic servo actuator by a second mechanical connection;
   a command system comprising:
      a first command device connected through an electrical connection to the first pathway of the rotary electric actuator of said mechanical system,
      a second command device connected through an electrical connection to the second pathway of the rotary electric actuator of said mechanical system,
      a third command device connected through an electrical connection to the third pathway of the linear electric actuator.

2. The command transmission system according to claim 1, wherein the rotary actuator is irreversible.

3. The command transmission system according to claim 1, wherein the linear actuator is irreversible.

4. The command transmission system according to claim 1, wherein the first mechanical connection and the second mechanical connection are in series.

5. The command transmission system according to claim 1, comprising four mechanical systems.

6. The command transmission system according to claim 1, wherein the command system is configured to operate in at least one mode of the following operating modes:
   a nominal operating mode in which:
      the first command device is in an operational validity state, and is configured to:
         receive a piece of data from the first pathway, the piece of data relating to operating parameters of said first pathway;
         transmit the piece of data relating to the operating parameters received to a calculator;
         receive a command emitted from the calculator to the motor of the first pathway;
         emit the command to the motor of the first pathway;
      the second device is in a standby validity state and is configured to:
         receive a piece of data from the second pathway, the piece of data relating to operating parameters of said second pathway;
         emit the piece of data relating to the operating parameters received to the calculator;
      the third command device is in an operational validity state and is configured to:
         receive a piece of data from the third pathway, the piece of data relating to operating parameters of said third pathway;
         emit the piece of data relating to the operating parameters received to the calculator;
         receive a command emitted from the calculator to the motor of the third pathway, simultaneously with the reception of the command by the first command device,
         emit the command to the motor of the third pathway;
   a failure mode of the first command device in which:
      the first command device is in a non-operational validity state,
      the second command device is configured to shift from a standby validity state to an operational validity state, the change of state of the second command device resulting from the non-operational validity state of the first command device, and is configured to:
         receive a piece of data from the second pathway, the piece of data relating to operating parameters of said second pathway;
         transmit the first piece of data item relating to the operating parameters received to the calculator;
         receive from the calculator a command to be emitted to the motor of the second pathway;
         emit the command to the motor of the second pathway;
      the third command device is in an operational validity state and is configured to:
         receive a piece of data from the third pathway, the second piece of data relating to operating parameters of said third pathway;
         transmit the piece of data relating to the operating parameters received to the calculator;
         receive from the calculator, simultaneously with the reception of the command by the second command device, a command to be emitted to the motor of the third pathway;
         emit the command to the motor of the third pathway;
   a failure mode of the third command device in which:
      the first command device is in an operational validity state, and is configured to:
         receive a piece of data from the first pathway, the piece of data relating to operating parameters of said first pathway;
         transmit the piece of data relating to the operating parameters received to the calculator;

receive from the calculator at least one command to be emitted to the motor of the first pathway;

emit the command to the motor of the first pathway;

the second command device is in a standby validity state and is configured to:

receive at least one piece of data from the second pathway, the piece of data relating to operating parameters of said second pathway;

transmit the piece of data relating to the operating parameters received to the calculator;

the third command device is in a non-operational state; for each operating mode, the sum of each command received respectively by the motor of the first pathway or the motor of the second pathway and/or the motor of the third pathway ensures mechanical command of the hydraulic servo actuator.

7. The command transmission system according to claim 6, wherein:

the first pathway comprises a motor position sensor and a rotary position sensor;

the second pathway comprises a motor position sensor and a rotary position sensor;

the third pathway comprises a third motor position sensor and a linear position sensor;

and wherein a piece of data received by a pathway of the first, second and third pathways relating to the operating parameters of that pathway comprises:

a piece of data relating to the position of the motor included in the pathway and/or a piece of data relating to the position of the actuator in which said pathway is included.

8. The command transmission system according to claim 6 wherein a command emitted from the calculator to a command device comprises a position set point intended for the motor included in the pathway connected to said command device.

9. An assembly for commanding at least one hydraulic servo actuator, comprising:

a control module;

a command transmission system according to claim 1;

at least one hydraulic servo actuator.

10. An aircraft comprising a command assembly according to claim 9.

* * * * *